(12) United States Patent
Powchowicz

(10) Patent No.: US 11,340,559 B2
(45) Date of Patent: May 24, 2022

(54) SYSTEM AND METHOD FOR MANAGING A COUNTDOWN TIMER

(71) Applicant: ADVANCED DIGITAL BROADCAST S. A., Bellevue (CH)

(72) Inventor: Tomasz Powchowicz, Zielona Gora (PL)

(73) Assignee: ADVANCED DIGITAL BROADCAST S. A., Bellevue (CH)

( * ) Notice: Subject to any disclaimer, the term of this patent is extended or adjusted under 35 U.S.C. 154(b) by 72 days.

(21) Appl. No.: 16/449,482

(22) Filed: Jun. 24, 2019

(65) Prior Publication Data
US 2020/0004205 A1    Jan. 2, 2020

(30) Foreign Application Priority Data

Jun. 27, 2018 (EP) ...................................... 18180015

(51) Int. Cl.
*G04F 1/00* (2006.01)
*G06F 1/14* (2006.01)

(52) U.S. Cl.
CPC ................ *G04F 1/005* (2013.01); *G06F 1/14* (2013.01)

(58) Field of Classification Search
CPC .......... G04F 1/005; G06F 1/14; G06F 1/3228; G06F 11/0757
See application file for complete search history.

(56) References Cited

U.S. PATENT DOCUMENTS

| 7,844,212 B1 * | 11/2010 | Woo ....................... H04H 60/11 370/400 |
| 2019/0243310 A1 * | 8/2019 | Nagareda ................ G04F 1/005 |

* cited by examiner

*Primary Examiner* — Nabil H Syed
(74) *Attorney, Agent, or Firm* — Mark M. Friedman

(57) ABSTRACT

A method for managing a first countdown timer, the method comprising the steps of: receiving (201) a request to set the first countdown timer to a first time value; starting (202) the first countdown timer; receiving (203) a request to reset the first countdown timer; letting (204) the first countdown timer expire; setting up (205) a second countdown timer with the time being equal to said first time value minus a difference between said first countdown timer expiry time and said receiving of the request to reset the first countdown timer; starting (206) the second countdown timer.

6 Claims, 5 Drawing Sheets

SYSTEM AND METHOD FOR MANAGING A COUNTDOWN TIMER

TECHNICAL FIELD

The present invention relates to a system and method for managing a countdown timer. In particular the present invention relates to decreasing system resources required to managing countdown timers.

BACKGROUND OF THE INVENTION

In electronic devices there is often a need to provide a mechanism of a countdown timer. Further, in many cases the countdown timer is a rolling timer in a sense that there occur events, in the electronic device, which reset the countdown timer to its initial state.

For example, a functionality of entering a standby mode or turning a device off after a time-out is mostly demanded by standards gradually decreasing allowable energy use. In order to perform such operation a timer is created and initialized after each user interaction to extend a device's operation time. The timer is not influenced when the user is not using a device. After a defined time-out, a predefined action is executed, such as providing an alert that the device will enter a standby mode in 10 seconds.

Another example, is online sessions monitoring, in particular in case of secure connections between a client and a server (e.g. online shopping, online banking, online e-mail client and similar services). In such cases a session countdown timer (also referred to as inactivity timer) is executed for every client connecting to a given server. In practice it may be required to manage thousands of distinct timers and managing these timers may require significant resources from the server device.

Yet another example where a countdown timer may be applied is a so-called dead man's switch, which is a switch that is automatically operated if the human operator becomes incapacitated, such as through loss of consciousness, or being bodily removed from control. Originally applied to switches on a vehicle or machine, it has since come to be used to describe other intangible uses like in computer software. These switches are usually used as a form of fail-safe where they stop a machine with no operator from potentially dangerous action or incapacitate a device as a result of accident, malfunction, or misuse. They are common in such applications in locomotives, aircraft refuelling, freight elevators, lawn mowers, tractors, personal watercraft, outboard motors, chainsaws, snowblowers, tread machines, snowmobiles, amusement rides, and many medical imaging devices. (source: Wikipedia)

A disadvantage of the existing solutions is that each user interaction causes restarting of the respective timer. Typically, restarting a timer comprises two actions: canceling a currently active timer and scheduling a new timer. The operations of canceling and scheduling timers consume energy and resources, because depending on timers' implementation some hardware resources need to be stopped/started or in the case of software emulated timers, a set of operations for timer updating or registration and de-registration need to be executed. The cost of restarting a single timer is not high, but considering a long term period and a substantial number of user interactions, as well as a substantial number of users, it creates a significant cost (e.g. ten user interaction per minute, gives 2400 timer restarts in a 4 h long-term period).

It would therefore be advantageous to reduce resources required to manage timers, especially when there are thousands or more of such timers operating in parallel.

The aim of the development of the present invention is an improved and resources-effective system and method for managing a countdown timer.

SUMMARY AND OBJECTS OF THE PRESENT INVENTION

An object of the present invention is a method for managing a first countdown timer, the method comprising the steps of: receiving a request to set the first countdown timer to a first time value; starting the first countdown timer; receiving a request to reset the first countdown timer; letting the first countdown timer expire; setting up a second countdown timer with the time being equal to said first time value minus a difference between said first countdown timer expiry time and said receiving of the request to reset the first countdown timer; starting the second countdown timer.

Preferably, the method further comprises a step of setting the difference time to the first time value.

Preferably, said difference is calculated as the current time, at said first countdown timer expiry, minus the time of receiving of the request to reset the first countdown timer.

Preferably, said difference is calculated as a difference time between the first time value and the remaining time of the first countdown timer at the time of receiving of the request to reset the first countdown timer.

Another object of the present invention is a computer program comprising program code means for performing all the steps of the computer-implemented method according to the present invention when said program is run on a computer.

Another object of the present invention is a computer readable medium storing computer-executable instructions performing all the steps of the computer-implemented method according to the present invention when executed on a computer.

BRIEF DESCRIPTION OF THE DRAWINGS

These and other objects of the invention presented herein, are accomplished by providing a system and method for managing a countdown timer. Further details and features of the present invention, its nature and various advantages will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DESCRIPTION OF EMBODIMENTS

Figure 1:
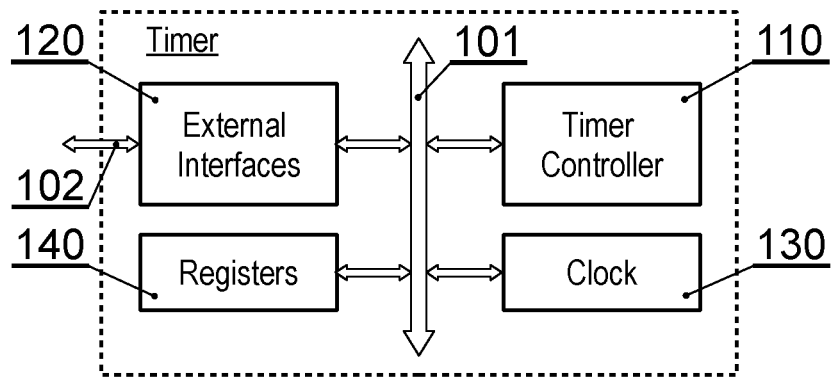
FIG. 1 presents a diagram of the system according to the present invention.

FIG. 1 presents a diagram of the system according to the present invention. The system is a timer module.

The system may be realized using dedicated components or custom made FPGA (Field-Programmable Gate Array) or ASIC (Application-Specific Integrated Circuit) circuits. Further, the system may be implemented as a mix of hardware and software components or as a fully software embodiment where respective modules are implemented as software.

The system comprises a data bus (101) communicatively coupled to a registers module (140). Additionally, other components of the system are communicatively coupled to the system bus (101) so that they may be managed by a timer controller (110).

The registers module (140) may store timer(s) configuration data such as an initial time, remaining time, or other configuration or temporary parameters required by the system.

A clock module (130) is configured to provide a time reference for all events occurring within the timer system.

An external interfaces module (120) may be provided in order to allow reporting timers-related data to external modules via a suitable communication link (102).

Figure 2:
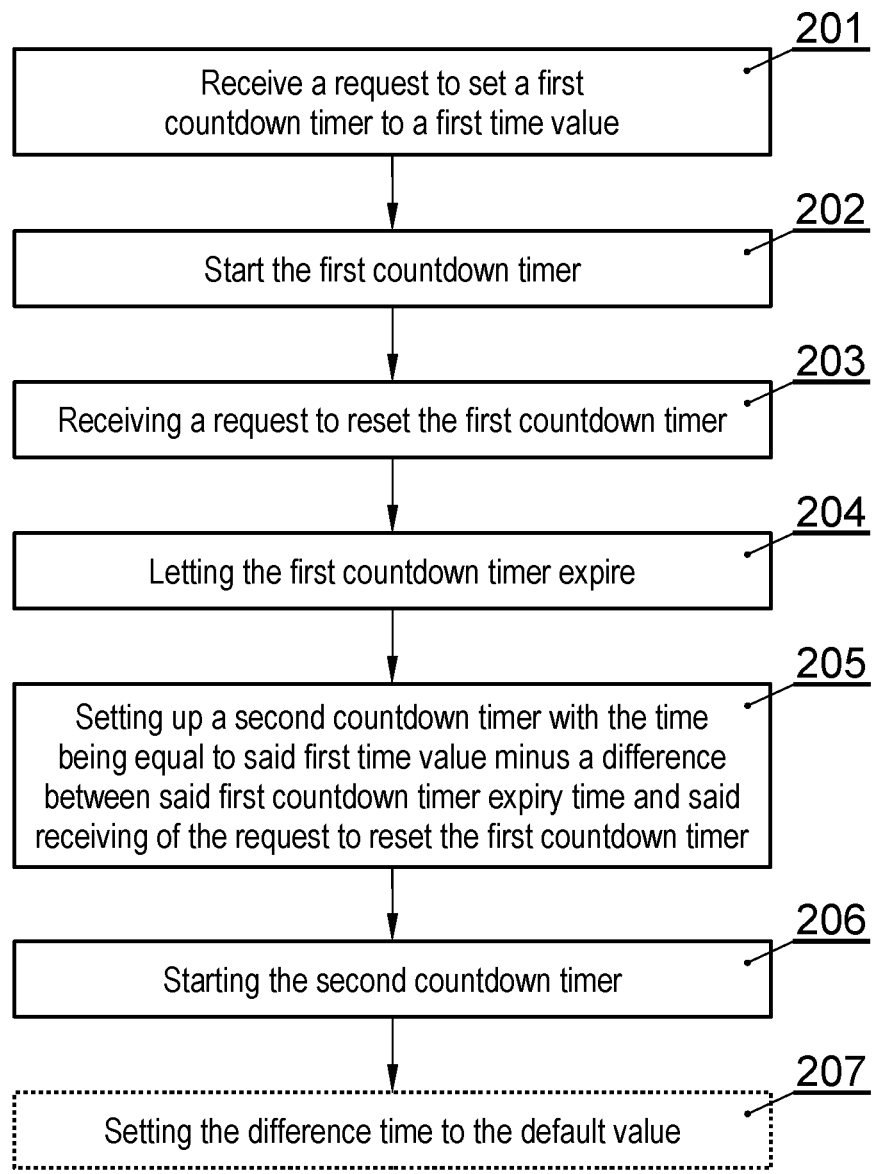
FIG. 2 presents a diagram of the method according to the present invention.

FIG. 2 presents a diagram of the method according to the present invention. The method starts at step (201) from receiving a request to set a first countdown timer to a first time value. This is a predefined value such as 5 minutes, which depends on application and use of the associated system or resource.

Subsequently, at step (202) the first countdown timer is started and the system awaits (203) and receives a request to reset the first countdown timer. This typically means an activity from a user, meaning that the system is not idle.

Next, at step (204) there is executed letting the first countdown timer expire (meaning that the time countdown is finished as planned) and subsequently (205) setting up a second countdown timer with the time being equal to said first time value minus a difference between said first countdown timer expiry time and said receiving of the request to reset the first countdown timer.

Lastly, at step (206) there is performed an action of starting the second countdown timer.

The above steps form a core of the present method, which may be followed by optionally setting the difference time (207) to the first time value i.e. a default value, which may for example also be set to 0. In case the difference time is different from its default value, it means that the system shall not call an action (e.g. session expiry) associated with the expiry of the first time value, when the first countdown timer expires. This step is also useful in case a user explicitly invokes a standby mode or ends the respective communication session.

Additionally, every time there is received a new request to reset the first countdown timer (before its expiry), the process will execute again steps (204-206) of the method in order to take the latest request into account.

According to one embodiment of the present invention, said difference is calculated as the current time, at said first countdown timer expiry, minus the time of receiving of the request to reset the first countdown timer.

According to another embodiment of the present invention, said difference is calculated as a difference time between the first time value and the remaining time of the first countdown timer at the time of receiving of the request to reset the first countdown timer.

Figure 3:
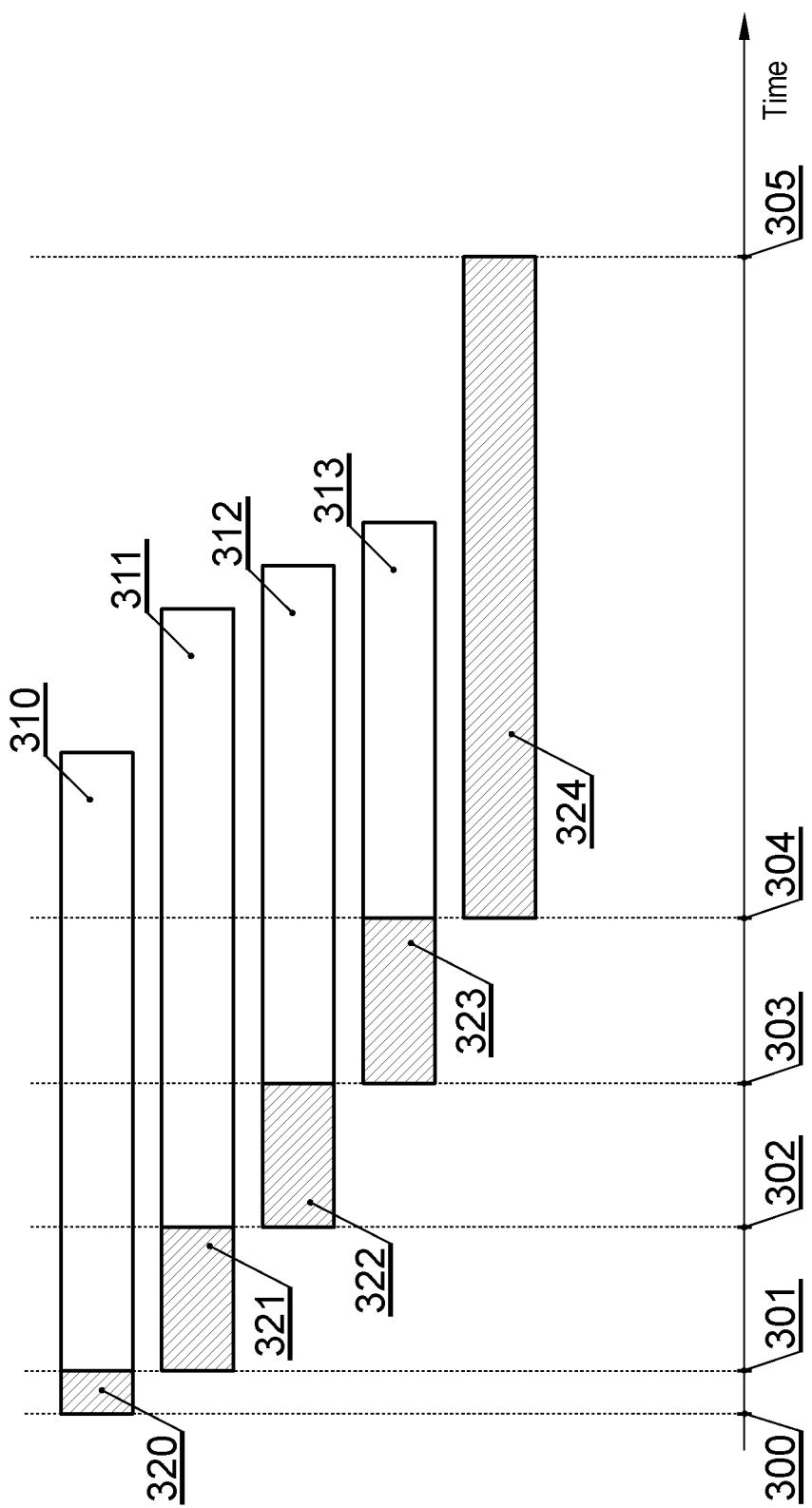
FIGS. 3 and 4 present a comparison between prior art use of timers and the use of timers according to the present invention.
Figure 4:
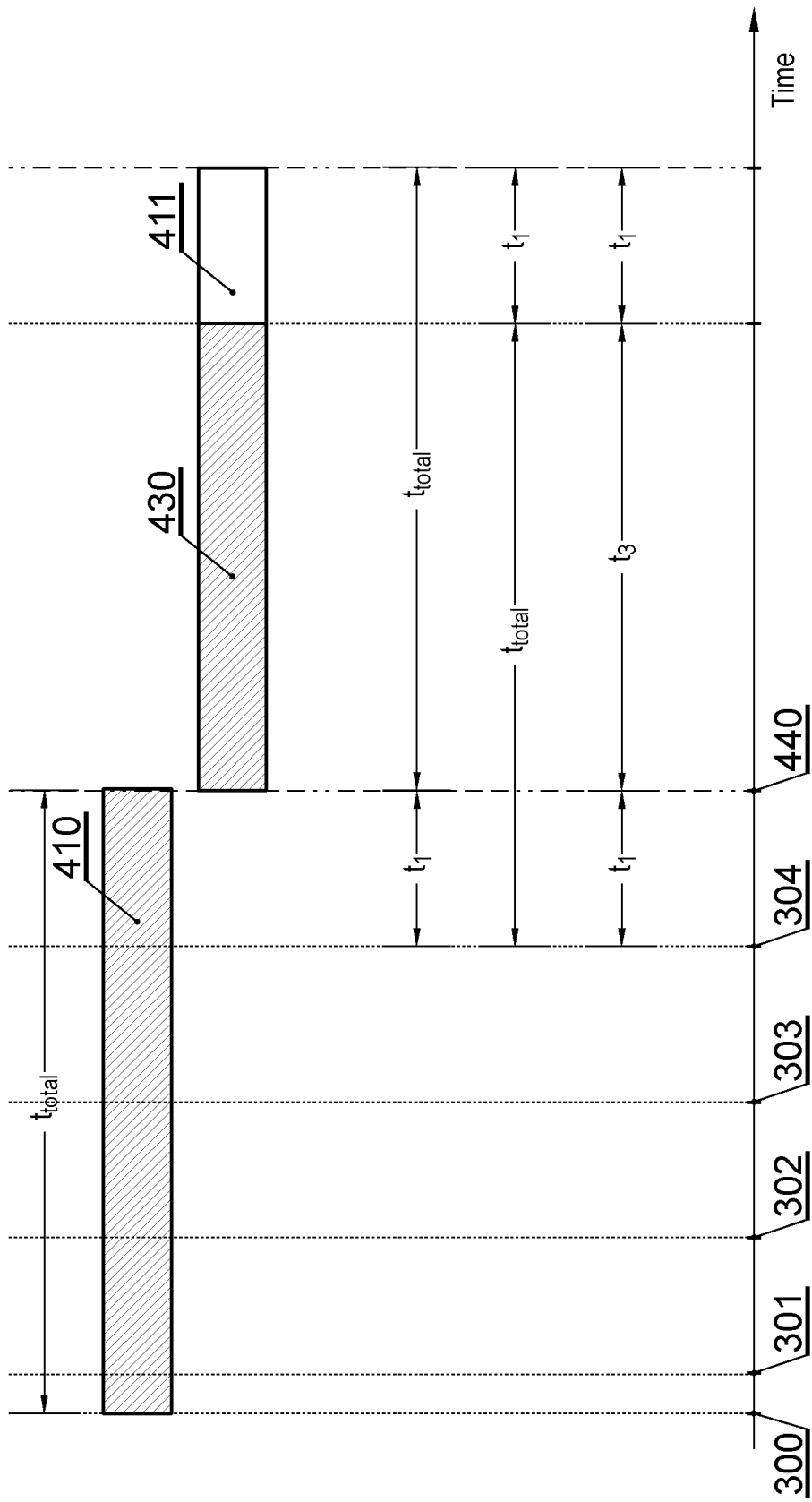

FIGS. 3 and 4 present a comparison between prior art use of timers and the use of timers according to the present invention. An initial timer is set and started at time instance (300). After its countdown time has partially elapsed (320), an event (301) occurs that causes the timer to be stopped (the remaining time to elapse (310) is canceled) and a new timer is set up and started (321). Similarly, the situation repeats for events (302, 303) and new timers (322, 323). As may be seen, each triggering event (301-304) causes a disposal of the current timer and setting up a new timer, which leads to multiple timer instances as well as all processing overhead associated with their management.

The timer (324) set as the last timer in this example, expires uninterrupted at a time instance (305). In this case five timers have to be used, wherein four of them are canceled along the way.

Now, turning to FIG. 4, instead of rescheduling a new timer (311, 312, 313) on user activity (300, 301, 302, 303, 304) only one timer at a time is utilized (410, 411) according to the present invention. This timer is never canceled. The standard timers (310, 311, 312, 313) are used partially (320, 321, 322, 323) whereas optimized timers using the method are executed entirely according to their scheduled countdown time. The first timer (410) is left until its programmed expiration delay, and the next delay (430) is calculated according to the last user interaction.

Therefore, according to the present invention, in the scenario of FIG. 3, the time instants and their corresponding events (300-304) are the same in FIG. 4, but the initially defined timer (time instance 300) is never canceled, but rather a configuration of the next timer is influenced by the events (301-304).

To this end, the events (301-304) influence the time interval $t_1$, which represents a difference between the countdown timer expiry time (440) and said receiving (301-304) of the request to reset the countdown timer (410).

In case of the event (304) it influences the total countdown timer interval $t_{total}$ such that $t_{total}$ is decreased by $t_1$ being the difference between the time instant (440) and the time instant (304). Thus the second timer is set up for a time $t_3$ being equal to $t_{total}-t_1$. This means that the second timer will run for a period shorter (430, $t_3$) by $t_1$ (411) than the first timer (410).

Figure 5:
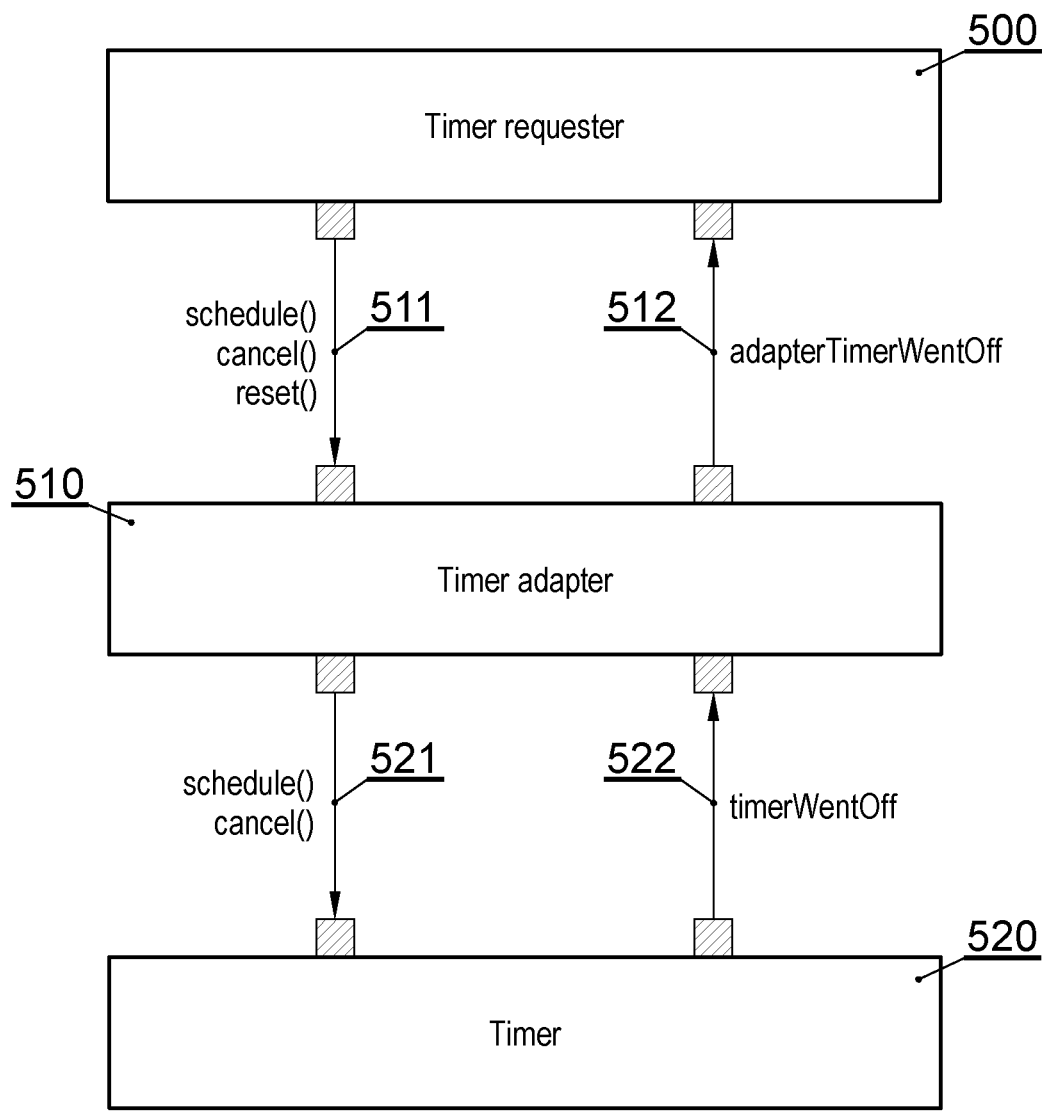
FIG. 5 presents a method of extending a software timer interface.

FIG. 5 presents a method of extending a software timer interface. This is an example of a software implementation of the present invention.

A timer requester (500) is configured to call a reset method on a timer adapter (510). The timer adapter (510) is configured to utilize a timer module (520) to effect the reset method using schedule( ) and cancel( ) methods and optimizing a number of timers needed to perform the requested operation. The timer module (520) is also configured to respond to a registered timerWentOff callback. The Timer adapter (510) reacts on the response and schedules a next timer or responds with a adapterTimerWentOff callback when the reset is expired. The reset method is realized by means of timer utilization described below.

In a further embodiment of the present invention, there may be provided a method of invoking a reset( ) function in order to minimize a number of timers with schedule and cancel( ) methods provided by the timer module (520). In order to implement the reset( ) function in an energy-efficient way, the method presented in FIG. 2 and FIG. 4 is used.

Instead of canceling a timer and scheduling a new one on each reset call (FIG. 3), only one timer at a time is used. When a timer (410) has expired the callback timerWentOff is called. On the callback, a new timer (430) is scheduled and the delay of the timer (430) $t_{total}$ is cut to the delay $t_3$ according to the last reset call (304) and the delay $t_1$, that elapsed during execution of the preceding timer (410), has to be subtracted from $t_{total}$.

Figure 6:
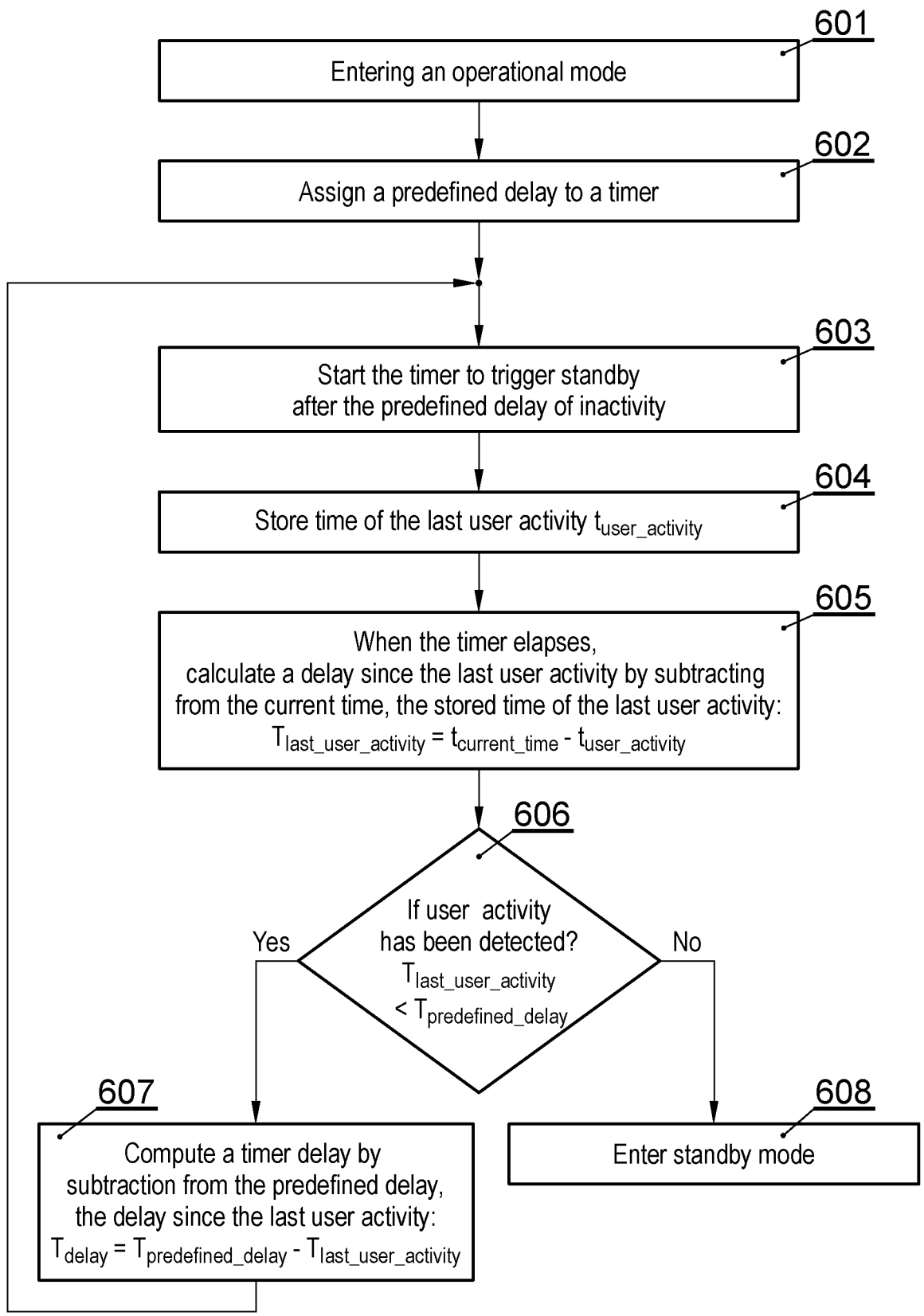
FIG. 6 presents application of the present invention in a set-top box system.

FIG. 6 presents application of the present invention in a set-top box system, which after entering a normal operation state (601) is configured to enter a standby state in case user inactivity (603) time exceeds a given threshold time (602).

Subsequently, at step (604) a last user activity time is stored and at step (605) when the timer has elapsed, there is calculated a delay since the last user activity by subtracting from the current time, the stored time of the last user activity:

$$T_{last\_user\_activity} = t_{current\_time} - t_{user\_activity}.$$

Next, at step (606), if user activity has been detected during operation of said timer i.e. $T_{last\_user\_activity} < T_{predefined\_delay}$, the system moves to step (607) and otherwise enters standby mode at step (608).

In case of step (607) the process computes a timer delay by subtraction from the predefined delay, the delay since the last user activity:

$$T_{predefined\_delay} = T_{predefined\_delay} - T_{last\_user\_activity}$$

Thereafter, the process turns to step (603) where the newly computed predefined delay is applied to the next timer.

Thus, as may be readily seen there is never executed an action of canceling a running countdown timer.

The present method allows for using reduced resources when managing countdown timers. Therefore, the invention provides a useful, concrete and tangible result.

Further, the present invention has been presented with respect to implementations in particular machines so that the machine or transformation test is fulfilled and that the idea is not abstract.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, the present invention may take the form of a computer program product embodied in any tangible medium of expression having computer usable program code embodied in the medium.

It can be easily recognized, by one skilled in the art, that the aforementioned method for managing a countdown timer may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A method for managing a first countdown timer, the method comprising the steps of:
receiving (201) a request to set the first countdown timer to a first time value;
starting (202) the first countdown timer from a starting point;
while the first countdown timer has not expired, receiving (203) a request to reset the first countdown timer to said starting point;
the method being characterized in that it further comprises the steps of:
letting (204) the first countdown timer expire without altering the first countdown timer;
setting up (205) a second countdown timer with a second time value that is equal to said first time value minus a difference time between said first countdown timer expiry time and said receiving of the request to reset the first countdown timer;
starting (206) the second countdown timer after the first countdown timer has expired.

2. The method according to claim 1 wherein the method further comprises a step of setting (207) the difference time to the first time value.

3. The method according to claim 1 wherein said difference is calculated as the current time, at said first countdown timer expiry, minus the time of receiving of the request to reset the first countdown timer.

4. The method according to claim 1 wherein said difference is calculated as a difference time between the first time value and the remaining time of the first countdown timer at the time of receiving of the request to reset the first countdown timer.

5. A non-transitory computer readable medium storing computer-executable instructions performing all the steps of the computer-implemented method according to claim 1 when executed on a computer.

6. The method of claim 1, further comprising the step of:
receiving at least one further request to reset the first countdown timer (203) prior to the first countdown timer reaching said expiry time, wherein every time there is received said further request to reset the first countdown timer (203) said steps of letting the first countdown timer expire, setting up said second countdown timer and starting said second countdown timer are executed in order to take a latest of said further request into account.

* * * * *